Oct. 14, 1952 G. O. GRIDLEY 2,613,941
CHUCKING MEANS
Filed Sept. 17, 1948

INVENTOR
GEORGE O. GRIDLEY
BY
*Mitchell Bechert*
ATTORNEYS

Patented Oct. 14, 1952

2,613,941

UNITED STATES PATENT OFFICE 2,613,941

CHUCKING MEANS

George O. Gridley, Berlin, Conn., assignor to The New Britain Machine Company, New Britain, Conn., a corporation of Connecticut Application September 17, 1948, Serial No. 49,707

4 Claims. (Cl. 279—60)

My invention relates to chucking means and in particular to chucking means for a machine tool.

It is an object of the invention to provide an improved chuck construction.

It is another object to provide a chuck construction wherein various-size jaws may be replaceably inserted from the front end of the chuck without requiring any adjustment from the back end of the chuck.

It is another object to provide an improved chuck construction wherein jaws may be more effectively retained both in rotation and at rest.

It is a further object to provide replaceable jaw means for a jaw holder or collet, wherein the jaw may be always resiliently urged in the direction of the jaw seat.

It is also an object to provide an improved jaw construction, wherein a piece of work may be positively supported in relatively close proximity to the limit of longitudinal travel of a turning tool operating on the work.

It is a general object to provide an improved chuck construction which may reduce the shock against the front end of the jaw holder or collet when a bar is being gripped, which may reduce the power required to pull the collet back into the spindle to grip the bar, and which not only may provide for the selective use of various jaw sizes for different sizes of bar to be chucked, but may be completely closed to the jaws from the front end of the collet.

Other objects and various further features of the invention will be pointed out or will occur to those skilled in the art from a reading of the following specification in conjunction with the accompanying drawings. In said drawings, which show, for illustrative purposes only, preferred forms of the invention:

Briefly stated, my invention contemplates an improved construction for chucking means, wherein there is a longitudinally actuated jaw holder or collet and a plurality of jaws slidably supported by said holder for coaction between an inclined collet seat and a piece of work. The arrangement of the jaws is preferably such that they may be readily removed from the front end of the assembly without requiring any adjustment at or access to the rear or actuating end of the assembly. Novel retaining means accessible from the front end of the machine may secure the jaws against dislodgement beyond a given limit; and, if desired, the retaining means may include resilient means. In one form to be described, a jaw itself may incorporate resilient means to cooperate with the retaining means and to assure that the jaw may always be resiliently urged in the direction of the collet seat, thus making for the relatively easy freeing of the jaws from the work upon release of the jaw holder or collet; to facilitate stressed engagement of the resilient means with the retaining means, one of these means may include cam means.

Figure 1:
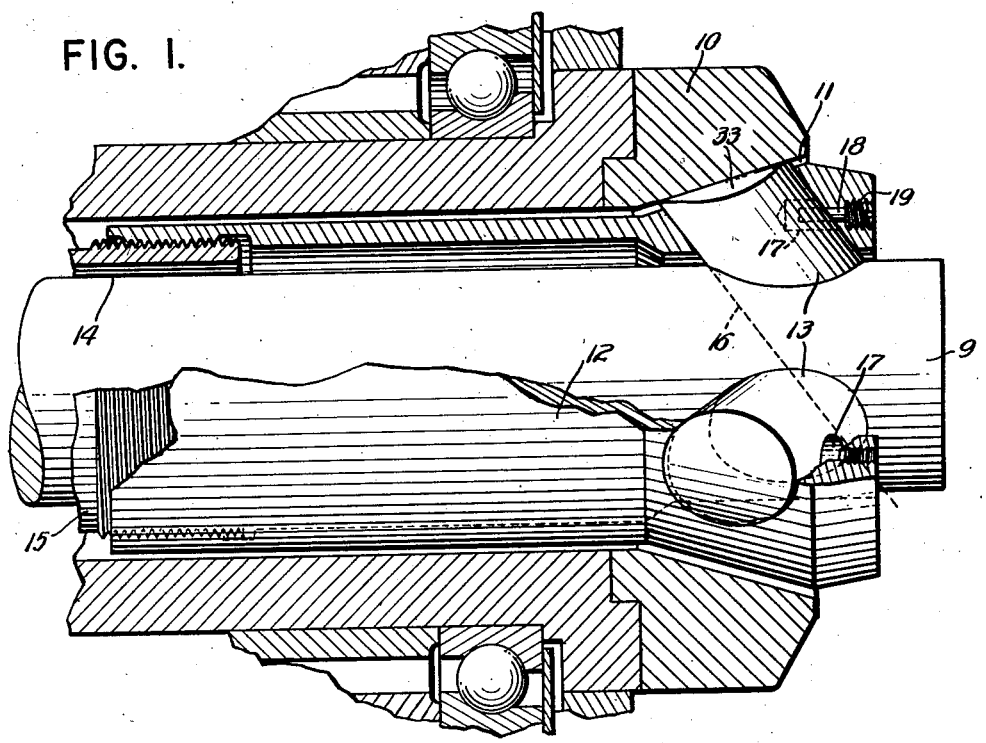
Fig. 1 is a partly broken but more or less vertical sectional view through a spindle in which chucking means according to the invention has been assembled.

Referring to Fig. 1 of the drawings, my invention is shown in application to a rotatable spindle 10, which may be one of a plurality of spindles on a multiple-spindle bar machine. The spindle 10 may include a forwardly expanding generally conical collet seat 11 for coaction with draw-back-type chucking means to support and grip a piece of bar stock 9. The chucking means may comprise a jaw holder or collet 12 having its forward end appropriate guide passages for the generally radial sliding support of a corresponding plurality of independently displaceable jaws 13. The jaw holder or collet 12 may be threadedly engaged, as at 14, to a draw-back or collet tube 15 in the conventional manner. While the member 12 is not strictly a collet in the ordinarily understood sense of the word, the word "collet" as used herein will be understood to refer to the solid and unflexed jaw-holding member 12.

In accordance with a feature of the invention, the jaws 13 may be readily removably inserted at the front end of the machine without requiring adjustment at the rear or actuating end of the chucking assembly, and, at the same time, the front of the collet 12 may be continuous and unbroken so as not to present openings for the entrapment of chips, dirt, and other foreign matter. Although the jaws 13 may be of any desired cross-sectional shape or configuration, I have shown the jaws 13 as being formed cylindrically, as from a bar, and each jaw 13 may therefore be guided in a bore in the head or front end of the collet 12. In order to facilitate removal of the jaws 13, and for other purposes which will later be clear, the axis of each jaw may be inclined away and generally backward from a radial plane, that is, from a plane normal to the axis of the spindle 10. This inclination of the jaws may be such that all projections of the jaws may clear or may approach clearance with the front open end of the collet 12. In the case of the upper jaw 13 shown, this clearance may be demonstrated by the dotted line 16. It will be appreciated that as long as projections, such as the projection line 16, clear the opening at the front end of the collet 12, and that as long as the projection of one jaw clears the projection of another, at least for the extent of guided support in the collet 12, then it is readily possible to insert jaws 13 of various sizes through said opening.

In order to retain the jaws 13 in an assembled position, I provide lost-motion means accessible from the forward end of the machine and loosely connecting the jaws to the collet 12. In the form shown in Fig. 1, the lost motion is achieved by provision of an oversize opening 17 in the form of a longitudinally rearwardly extending bore through the front edge of the jaw 13, and a pin or other abutment means 18 fixedly carried by the collet 12 may loosely engage the jaw opening 17. The pin or other abutment means 18 may be formed with a screw head 19 threaded through the collet 12 and having means (preferably facing forwardly) to engage a screw driver or the like.

Figure 2:
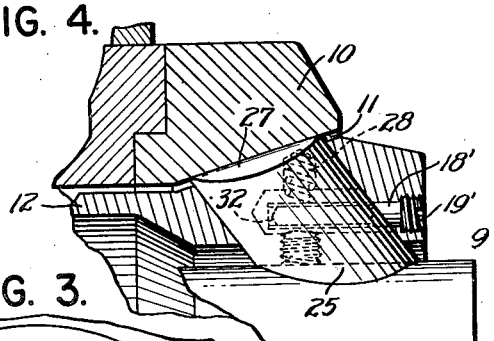
Fig. 2 is a fragmentary view similar to Fig. 1 but with different size jaws inserted in the jaw holder or collet of Fig. 1 in order to grip a smaller size bar.
Figure 3:
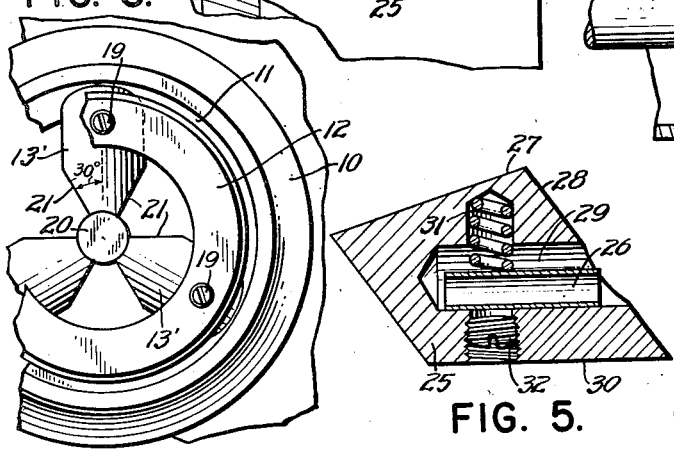
Fig. 3 is a fragmentary and partly broken-away front end view of the arrangement of Fig. 2.

In Figs. 2 and 3, I show how the collet 12 of Fig. 1 may be readily adapted in conjunction with another set of jaws 13' for the effective support of a very substantially smaller piece of stock 20. The only adjustment necessary in replacing the jaws 13 with the longer jaws 13' is the removal of the threaded pins or abutments 18, and, of course, this removal is facilitated by the ready accessibility of the screw heads 19 at the front of the machine. Once the longer jaws 13' have been inserted in the manner shown in Fig. 2, the same pin or abutment means 18 may be employed to retain the jaws by means of the loose or lost-motion fit with respect to an opening 17' in the jaws 13'.

In Fig. 2, it will be appreciated that the cross-sectional diameter or size of the jaws 13' approaches and even exceeds that of the work to be supported by the jaws. In order, then, to produce coaction between a plurality of jaws 13' and the work 20, lateral faces 21 of the jaws 13' are preferably cut away for clearance. In the three-jaw case shown, the angle between a line joining work-biting limits of one jaw 13' is about 60 degrees from a corresponding line joining work-biting limits of another jaw 13'. This fact may be advantageously employed in selecting the angle between the two adjacent lateral faces 21 of any two adjacent jaws 13'; the lateral jaw faces 21 for a particular jaw 13' may thus be of the order of 60 degrees apart. Upon removal of one of the jaws 13', it will be noted that the necessary displacement may correspond with the distance A marked on Fig. 2; and, as long as the jaws 13' is permitted freedom to displace a distance A downwardly, that is, radially inwardly, then the jaw 13' may be removed while two other jaws 13' are held in the collet 12. By providing the lateral jaw faces 21 at a 60 degree angle, it will be appreciated that the necessary clearance for the full displacement A is clearly possible, even for sets of longer jaws to support smaller stock than the stock 20 in the collet 12.

Figure 4:
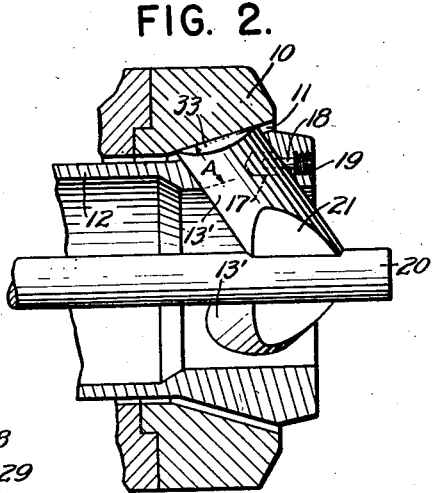
Fig. 4 is an enlarged fragmentary sectional view of chucking means incorporating a modified jaw according to the invention.
Figure 5:
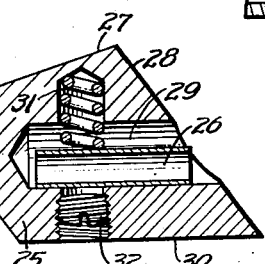
Fig. 5 is an enlarged sectional view of the jaw of Fig. 4, prior to assembly in the jaw holder or collet of Fig. 4.

Referring to the modification of Figs. 4 and 5, I show means whereby a jaw 25 may have the desirable attributes discussed above in connection with Figs. 1, 2, and 3; at the same time, means may be provided constantly resiliently to urge the jaw 25 in a direction toward the collet seat 11. The resilient means for accomplishing this result may be carried by the collet 12, but, in the form shown, the resilient means is carried by and built into the jaw 25 itself. The resilient mechanism may include an element 26 having lost-motion freedom within the jaw 25 and urged by resilient means, such as a compression coil spring 28, in a direction away from the collet-seat-engaging surface 27 of the jaw. The displaceable member 26 may be a tube of smaller diameter than the span of a longitudinally rearwardly extending tube-receiving opening 29 in the jaw 25, and the opening 29 may be a bore in which the tube 26 is inserted. In order to facilitate assembly of resilient means in a jaw, such as the jaw 25, the work-engaging surface 30 may be bored generally radially (that is, preferably normal to the tube 26), as at 31, to receive the spring 28. The tube 26 may be inserted under the compression spring 28, and the open end of the bore 31 may then be closed off, as by means of a screw fitting 32 below the tube 26, so as to prevent the entry of dirt, chips, and the like into the jaw 25.

It will be appreciated that the jaw assembly, as shown in Fig. 5, may be complete and self-contained. Because the external dimensions of this assembly are similar to those of the jaws 13 of Fig. 1, the jaw assembly may be inserted bodily into the collet 12. When so inserted, retaining-abutment means 18' may be longitudinally thrust into secure supporting engagement with the inside of the tube 26, and such insertion may involve a slight lifting or further compression of the spring 28. To facilitate insertion, the front end of the abutment means 18' may be conically formed, as at 32, to provide camming means for the slight lifting or further compression of spring 28. The abutment means 18' may, like the abutment means 18 of Fig. 1, include a screwhead 19' for secure removable engagement with the front end of the collet 12.

For highly effective seating, the seat-engaging surfaces 33 of the various jaws 13 and 13', and the seat-engaging surface 27 of the jaw 25, may be cylindrically formed about an axis inclined in accordance with the inclination of the conical collet seat. Such construction may promote lateral alignment and support of the jaws and may serve to prevent cocking or jamming the jaws. Jaw and seat arrangements utilizing cooperating cylindrical and conical surfaces are described in detail in my co-pending application, Serial No. 745,583, filed May 2, 1947.

It will be appreciated that I have described an improved chuck construction wherein there may be the effect or benefit of a plurality of chuck sizes, all insertably removable from the front end of the machine. My particular arrangement of the jaws with backwardly inclined sliding axes may not only permit the more firm support of a bar near the working tools, but shocks against the front end of the collet may be reduced (as compared with those occurring in the case of a purely radialy slidable jaw), when the bar is being gripped. My novel arrangement, furthermore, may reduce the power required to pull the collet back into the spindle in order to secure a given grip upon a bar, and the jaw may have greater wearing surface in the collet seat than if a purely radial sliding action were involved. Furthermore, my retaining means for holding the jaws in the collet 12 may serve the function of retaining jaw alignment for proper engagement with the collet seat and with the work.

While I have described my invention in detail for the preferred forms shown, it will be understood that modifications may be made within the scope of the invention as defined in the claims which follow.

I claim:

1. In chucking means of the character indicated, a generally cylindrical collet having a work-receiving bore and with an edge at the forward end of said bore, a plurality of generally cylindrical jaws generally radially slidingly supported in corresponding generally radial bores in said collet, each of said generally radial bores being on an axis in a plane passing generally through the axis of the work to be supported by said chucking means and inclined backward from the front end of said collet, the geometrical projections of said inclined bores passing through the general plane of said edge wholly within the perimeter of said edge, whereby each said jaw may freely slide generally radially and forwardly wholly through the central opening defined by said edge and out the forward end of said collet.

2. In chucking means of the character indicated, a collet, a jaw generally radially slidably guided by said collet, said jaw having an opening extending generally transversely of the sliding axis of said jaw and facing generally forwardly of said jaw, abutment means removably carried at the forward end of said collet and projecting in said opening, resilient means carried by said jaw between one side of said opening and said abutment means and urging said jaw in a direction to seat said jaw, and a member loosely fitting said opening and in engagement with said resilient means, said member including means to be engaged by said abutment means.

3. As an article of manufacture, a chucking jaw having a sliding axis with seat-engaging means at one end and with work-engaging means at the other end, said jaw having an enlarged opening intermediate said ends and extending generally transversely of said sliding axis and having a further opening communicating with said first opening and in general alignment with said sliding axis, a spring bottomed in said second opening and projecting into said first opening, and a locating tube aligned with said first opening and receiving abutment of said spring, whereby when inserted in a collet holder a transverse pin or the like in the collet holder may be projected into said tube to provide a reference for spring-action of said jaw.

4. As an article of manufacture, a chucking jaw having a sliding axis with seat-engaging means at one end and with work-engaging means at the other end, said jaw having an enlarged opening intermediate said ends and extending generally transversely of said sliding axis, spring means in said opening and including means at one end bottomed directly against the body of said jaw, said spring means having a compressional resilient action substantially along said sliding axis and including at the other end thereof locating means movable with said other end of said spring means and aligned with said opening, whereby when inserted in a collet holder a transverse pin or the like in the collet holder may be projected into lifting engagement with said locating means to provide a reference of spring action of said jaw.

GEORGE O. GRIDLEY.

REFERENCES CITED

The following references are of record in the file of this patent:

UNITED STATES PATENTS

| Number | Name | Date |
|---|---|---|
| 680,448 | Wallace | Aug. 13, 1901 |
| 2,015,685 | Martin | Oct. 1, 1935 |

FOREIGN PATENTS

| Number | Country | Date |
|---|---|---|
| 1,044 | Great Britain | 1884 |
| 125,684 | Great Britain | 1918 |
| 564,389 | France | 1923 |